United States Patent [19]

Haka

[11] Patent Number: 5,346,043
[45] Date of Patent: Sep. 13, 1994

[54] TORQUE CONVERTER AND VISCOUS CLUTCH

[75] Inventor: Raymond J. Haka, Rochester, Mich.

[73] Assignee: General Motors Corporation, Detroit, Mich.

[21] Appl. No.: 113,871

[22] Filed: Aug. 27, 1993

[51] Int. Cl.⁵ .................... F16H 45/02; F16D 47/06
[52] U.S. Cl. .................... 192/3.29; 192/48.3; 192/58 B; 192/106.1
[58] Field of Search .............. 192/3.28, 3.29, 3.3, 192/48.3, 58 B, 106.1

[56] References Cited
U.S. PATENT DOCUMENTS

| | | | |
|---|---|---|---|
| 4,317,510 | 3/1982 | Staub, Jr. | 192/48.3 |
| 4,473,145 | 9/1984 | Bopp | 192/3.29 |
| 4,540,076 | 9/1985 | Bopp | 192/58 B |
| 5,172,796 | 12/1992 | Campbell et al. | 192/3.29 |

*Primary Examiner*—Richard M. Lorence
*Attorney, Agent, or Firm*—Donald F. Scherer

[57] ABSTRACT

A torque converter and viscous clutch has a viscous fluid chamber and a hydraulic fluid chamber. The fluid chambers are sealingly separated and physically interconnected by a piston interface. The piston interface is responsive to the thermal expansion in the viscous fluid chamber to permit expansion thereof. The piston is also responsive to increased pressure in the hydraulic fluid chamber to correspondingly increase the pressure in the viscous fluid chamber.

1 Claim, 1 Drawing Sheet

TORQUE CONVERTER AND VISCOUS CLUTCH

TECHNICAL FIELD

This invention relates to torque converter and clutch assemblies, and more particularly, to such clutch assemblies having a viscous portion in serial drive relationship with a friction portion.

BACKGROUND OF THE INVENTION

Modern automatic transmissions generally utilize a torque converter or fluid coupling to provide a slipping drive connection between an engine and a multi-speed gear arrangement. The main purpose of the torque converter is to provide increased torque multiplication during starting of a vehicle. The torque converter is also useful in restricting the amount of engine torsional vibrations that can be transmitted to the gearing arrangement and therefore felt by the operation.

However, at higher vehicle speeds and engine speeds, the torsional vibrations are less harsh and it is then desirable to eliminate the torque converter or fluid drive. This has generally been accomplished by the use of a friction type clutch which has a spring damper included therewith to provide for reduced vibration transmission.

It has also been known to utilize a viscous clutch in serial arrangement with the friction clutch to provide continued damping between the engine output and the gearing input. The viscous portion of the clutch is generally a sealed arrangement, such that the transfer of fluid into and out of the viscous clutch is not permitted. Accordingly, the viscous fluid can have a significantly different pressure than the pressure of the fluid available in the torque converter, which is generally a hydraulic type fluid.

It is also known that it is not wise to intermix these two fluids as this reduces the torque transmitting capacity of the viscous fluid in the viscous portion of the clutch.

SUMMARY OF THE INVENTION

The present invention has a pressure balance piston or interface to ensure the viscous clutch fluid and the torque converter fluid are maintained at substantially the same pressure. This prevents distortion of the internal components of the viscous clutch and distributes the apply pressure of the friction clutch evenly across the pressure plate. The pressure balance piston also ensures that any pressure differential across the rotating seals between the input and the output of the viscous clutch will be minimized.

It is an object of this invention to provide an improved torque converter clutch having serially arranged friction and viscous portions, wherein the fluid pressure in the viscous portion is maintained substantially equal to the apply pressure in the friction portion to an intermediate piston.

It is another object of this invention to provide an improved torque converter clutch having a fluid pressure applied friction clutch and a viscous clutch serially disposed therewith for torque transmission between an input member and an output member, wherein the viscous fluid in the viscous clutch is maintained at a pressure level substantially equal to the apply fluid pressure through a piston member which provides a movable interface between the fluids.

It is yet another object of this invention to provide an improved torque converter clutch, as set forth above, wherein the piston interface provides structure for filling the viscous clutch after assembly in the torque converter clutch.

These and other objects and advantages of the present invention will be more apparent from the following description and drawings.

DESCRIPTION OF THE EXEMPLARY EMBODIMENTS

Figure 1:
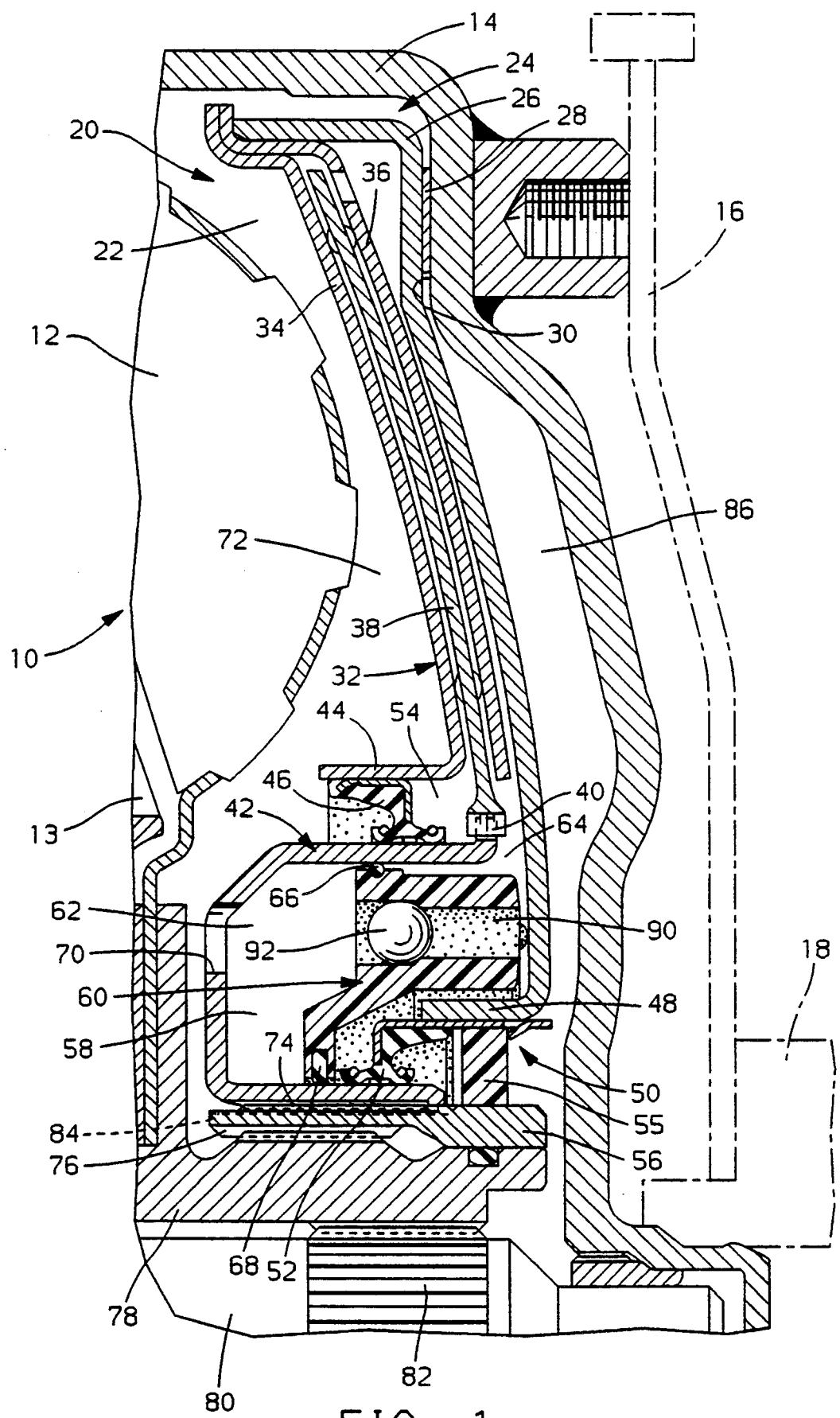
FIG. 1 is a cross-sectional view of a portion of a torque converter and clutch assembly incorporating the present invention.

Referring to the drawings, wherein like characters represent the same or corresponding parts throughout the several views, there is seen in FIG. 1 a torque converter and clutch assembly designated 10. The torque converter and clutch assembly 10 includes a conventional torque converter having at least a turbine 12 and a stator 13.

An impeller portion or pump of the torque converter is not shown. This assembly is a conventional power transmitting assembly and the structure is well known to those skilled in the art.

The torque converter and clutch assembly 10 has an input shell or drive member 14 which is drivingly connected to a conventional flex plate, shown in phantom line at 16, which in turn is driven by an engine output shaft shown in phantom line at 18. These structures are well known and it is not believed that further description is necessary at this juncture.

A clutch assembly, generally designated 20, is disposed in a fluid chamber 22 between the turbine 12 and the input shell 14. The clutch assembly 20 includes a friction portion or clutch 24 comprised of a pressure plate 26 and a friction facing 28. The friction facing 28 is adapted to selectively frictionally engage and disengage an inner surface 30 of the input shell 14 in response to a pressure differential across the pressure plate 26.

The clutch assembly 20 also has a viscous portion 32 which includes inner and outer housing members 34, 36 and an inner output member 38. The output member 38 has a spline portion 40 which is drivingly connected to a piston housing 42.

The inner housing 34 and outer housing 36 are secured at the outer periphery thereof to the pressure plate 26. The housing 34 has an inner hub 44 in which a conventional lip seal 46 is disposed. The lip seal 46 provides a sealing arrangement between the hub 44 and the piston housing 42.

The pressure plate 26 has an inner hub 48 to which a lip seal and bushing assembly 50 is secured. The lip seal and bushing assembly 50 includes a lip seal 52 which sealingly engages the piston housing 42 and a bushing 55 which is sealingly disposed between the inner hub 48 of pressure plate 26 and a sleeve shaft 56.

The seals 46 and 52 cooperate with the housings 34 and 36 to form a viscous fluid chamber 54 in which a silicone fluid is contained. As is well known, the silicone fluid is useful in transmitting drive between rotating members. The housings 34 and 36 are rotatable with the input shell 14 when the friction surface 28 is engaged, such that a relative rotation between the housings 34 and 36, and the viscous clutch output plate 38 is present. The viscous fluid in the chamber 54 is active to transmit torque between these relatively rotating parts, such that the piston housing 42 has a rotational component imposed thereon.

The piston housing 42 has an annular chamber 58 in which an annular piston 60 is slidably disposed. The annular piston 60 separates the chamber 58 into a hydraulic fluid chamber 62 and a viscous fluid chamber 64. The piston 60 is freely slidable in the chamber 58. The only restriction to this axial movement is a pair of annular seals 66 and 68 which are fitted to the piston 60. The seals 66 and 68 cooperate to prevent the mixing of the fluid in chamber 64 with the fluid in chamber 62. The fluid in chamber 62 is in fluid communication through a passage 70 with the fluid in a clutch apply chamber 72 formed between the turbine 12 and the housing 34.

The piston housing 42 has a spline 74 which is drivingly connected with the sleeve shaft 56. The sleeve shaft 56 has a spline portion 76 which is drivingly connected with an output hub 78 which is secured to the turbine 12. The output hub 78 is drivingly connected with a transmission input shaft 80 through a spline member 82. A fluid passage 84 is formed in the sleeve shaft 56 to permit fluid communication between the right side of seal 52 and the chamber 72.

As is well known with torque converter clutches, it is preferable to disengage the clutch by supplying fluid pressure to a disengagement chamber 86 which is formed between the input shell 14 and the pressure plate 26. To engage the friction portion 24, the fluid pressure is supplied directly to the torque converter and thence to the chamber 72 while the chamber 86 is connected to exhaust or low pressure.

When fluid pressure to apply the clutch assembly 20 is present in chamber 72, the pressure is effective along the entire annular surface of the housing 34. In order to prevent deflection of this housing, it is necessary to increase the pressure of the viscous fluid, such that the pressure differential across the housings 34 and 36 will be essentially zero. This is accomplished by the piston 60 which has one annular surface open to the chamber 62 and the other annular surface open to the chamber 64.

As previously mentioned, the chamber 62 is pressurized by the fluid in the chamber 72 and the chamber 64 is open to the viscous fluid within the chamber 54. The piston 60 will respond to fluid pressure in the chambers 62 and 64 to provide a movable interface, such that the pressures in these chambers will be balanced and the pressure across the housing 34 will be balanced.

When the clutch friction surface 28 is released by fluid pressure in the chamber 86, the piston 60 will again be adjusted axially within the piston housing 42 to permit a reduction in the fluid pressure in the chamber 54 to match or be slightly greater than the pressure in the chamber 72. When the pressure in the chamber 72 is the exhaust pressure for the torque converter, the pressure in chamber 54 can be higher than the pressure in the chamber 72 without any deleterious effects being evident within the viscous clutch. Since the friction clutch is disengaged, the viscous clutch is inoperable at this time and therefore the pressure differential will have very little effect.

It is known that in viscous clutches at high torque transmission rates, the viscous fluid can increase in temperature. This is to be expected in viscous clutches. The piston 60 will accommodate these temperature changes in the viscous fluid in chamber 54 by permitting the expansion of the chamber 54 as a result of increasing pressures to the thermal expansion of the viscous fluid. This will maintain the pressure balance desired within the viscous clutch in chamber 72 while not limiting the temperature rise within the viscous fluid nor requiring a significant amount of cooling to maintain the temperature of the viscous fluid within a narrow operating range.

The piston 60 has formed therein an annular passage 90 in which a ball 92 is sealingly engaged. The passage 90 with the ball 92 removed can be aligned with the passage 70 in the piston housing 42. After assembly of the viscous clutch portion with the pressure plate 26, it is possible to then inject the viscous fluid through the passage 90 into the chamber 54 of the viscous clutch portion. When a sufficient or desired volume of fluid has been placed in the chamber 54, the ball 92 is pressed into place thereby sealing the chamber 54 from the chambers 62 and 72. This permits the clutch to be essentially fully assembled prior to the viscous fluid being introduced. This is beneficial in that there is no possibility of fluid loss during assembly.

The embodiments of the invention in which an exclusive property or privilege is claimed are defined as follows:

1. A torque converter and clutch comprising:
an input member;
an output member;
clutch means disposed between said input and output members for effecting a drive connection therebetween, said clutch means comprising:
an apply chamber;
a release chamber;
means for supplying hydraulic fluid to the chambers;
friction clutch means for engaging said input member in response to fluid pressure in the apply chamber;
viscous clutch means operatively connected between the friction clutch means and said output member including drive means secured to the friction clutch means, driven means drivingly connected with said output means, viscous drive fluid disposed between said drive and driven means for transmitting drive torque therebetween, a compensation chamber open to said viscous drive fluid and said hydraulic fluid in said apply chamber and piston means slidably disposed in said compensation chamber for preventing commingling of said viscous drive fluid and said hydraulic fluid and being responsive to the pressure and temperature of said fluids for maintaining a pressure balance between the viscous drive fluid and the hydraulic fluid.

* * * * *